US012775849B2

(12) United States Patent
Volpi et al.

(10) Patent No.: US 12,775,849 B2
(45) Date of Patent: Oct. 27, 2026

(54) ONLINE CONTINUAL LEARNING SYSTEM AND METHOD

(71) Applicant: NAVER CORPORATION, Seongnam-si (KR)

(72) Inventors: Riccardo Volpi, Grenoble (FR); Ioannis Kalantidis, Grenoble (FR); Diane Larlus, La Tronche (FR); César De Souza, Grenoble (FR); Gregory Rogez, Gières (FR)

(73) Assignee: NAVER CORPORATION, Seongnam-si (KR)

( * ) Notice: Subject to any disclaimer, the term of this patent is extended or adjusted under 35 U.S.C. 154(b) by 1036 days.

(21) Appl. No.: 17/466,195

(22) Filed: Sep. 3, 2021

(65) Prior Publication Data

US 2023/0082941 A1 Mar. 16, 2023

(51) Int. Cl.

| | |
|---|---|
| ***G06N 3/088*** | (2023.01) |
| ***G06F 18/211*** | (2023.01) |
| ***G06F 18/22*** | (2023.01) |
| ***G06F 18/2411*** | (2023.01) |
| ***G06F 18/2431*** | (2023.01) |

(52) U.S. Cl.

CPC ........... *G06N 3/088* (2013.01); *G06F 18/211* (2023.01); *G06F 18/22* (2023.01); *G06F 18/2411* (2023.01); *G06F 18/2431* (2023.01)

(58) Field of Classification Search

CPC ....... G06N 3/088; G06F 18/211; G06F 18/22; G06F 18/2411; G06F 18/2431

See application file for complete search history.

(56) References Cited

U.S. PATENT DOCUMENTS

| | | | | |
|---|---|---|---|---|
| 2021/0019632 | A1* | 1/2021 | Rostami | G06N 3/084 |
| 2021/0383158 | A1* | 12/2021 | Shim | G06F 18/217 |
| 2021/0406315 | A1* | 12/2021 | Honey | G06F 16/9035 |

OTHER PUBLICATIONS

Aljundi et al., “Online Continual Learning with Maximally Interfered Retrieval,” 2019, arXiv:1908.04742v3 (Year: 2019).*

Yoon et al., “Online Coreset Selection for Rehearsal-based Continual Learning,” 2001, arXiv:2106.01085v1 (Year: 2001).*

Pelosin et al., “More Is Better: An Analysis of Instance Quantity/Quality Trade-off in Rehearsal-based Continual Learning,” Jun. 2021, arXiv:2105.14106v2 (Year: 2021).*

Ketz et al., “Continual Learning Using World Models for Pseudo-Rehearsal,” 2019, arXiv:1903.02647v2 (Year: 2019).*

Relins, “Dense NN with Categorical Embeddings,” 2020, https://www.kaggle.com/code/dustyturner/dense-nn-with-categorical-embeddings/notebook (Year: 2020).*

(Continued)

*Primary Examiner* — Michael J Huntley

*Assistant Examiner* — Vincent Anton Spraul

(74) *Attorney, Agent, or Firm* — Greer, Burns & Crain, Ltd

(57) ABSTRACT

A method for processing a new sample in a data stream for updating a machine learning model configured for performing a task. The machine learning model is implemented by a processor in communication with a memory storing previous samples. The new sample is received, and the machine learning model is trained using combined samples including the new sample and the previous samples. The new sample is stored or not stored in the memory based on distances between the samples in an embedding space learned by the machine learning model.

29 Claims, 10 Drawing Sheets

(56) References Cited

OTHER PUBLICATIONS

Gonzalez et al., "Faster Training by Selecting Samples Using Embeddings," 2019, 10.1109/IJCNN.2019.8851717 (Year: 2019).*
Robinson et al., "Contrastive Learning with Hard Negative Samples," 2020, arXiv:2010.04592v1 (Year: 2020).*
Isele et al., "Selective Experience Replay for Lifelong Learning," 2018, Thirty-Second AAAI Conference on Artificial Intelligence (Year: 2018).*
Aljundi, R., et al., "Gradient based sample selection for online continual learning," 33rd Conference on Neural Information Processing Systems (NeurIPS 2019), Vancouver, Canada published on arXiv.org as 1903.08671, Oct. 31, 2019, 13 pages.
Chaudhry, A., et al., "Using Hindsight to Anchor Past Knowledge in Continual Learning, " published on arXiv.org as 2002.08165v1, Feb. 19, 2020, 15 pages.
Chaudhry, A., et al., "Efficient Lifelong Learning With A-Gem," Published as a conference paper at ICLR 2019, 2019, 20 pages.
Chaudhry, A., et al., "Continual Learning with Tiny Episodic Memories," Proceedings of the 36th International Conference on Machine Learning, Long Beach, California, PMLR 97, 2019, 13 pages.
Chaudhry, A., et al., "On Tiny Episodic Memories in Continual Learning," published on arXiv.org as 1902.10486v4, Jun. 4, 2019, 15 pages.
Chen, T., et al., "A Simple Framework for Contrastive Learning of Visual Representations," Proceedings of the 37th International Conference on Machine Learning, Vienna, Austria, PMLR 119, 2020, 11 pages.
Cortes, C., et al., "AdaNet: Adaptive Structural Learning of Artificial Neural Networks," Proceedings of the 34th International Conference on Machine Learning, Sydney, Australia, PMLR 70, 2017, 10 pages.
Dosovitskiy, A., et al., "Generating Images with Perceptual Similarity Metrics Based on Deep Networks," 30th Conference on Neural Information Processing Systems (NIPS 2016), Barcelona, Spain, 2016, 9 pages.
Draelos, T., et al., "Neurogenesis Deep Learning," published on arXiv.org as 1612.03770v2, Mar. 28, 2017, 8 pages.
Ganin, Y., et al., "Unsupervised Domain Adaptation by Backpropagation," Proceedings of the 32 nd International Conference on Machine Learning, Lille, France, 2015, vol. 37, 10 pages.
Hayes, T., et al., "Memory Efficient Experience Replay for Streaming Learning," 2019 International Conference on Robotics and Automation (ICRA), Montreal, QC, Canada: IEEE, May 20-24, 2019, pp. 9769-9776.
Hayes, T., et al., "REMIND Your Neural Network to Prevent Catastrophic Forgetting," Computer Vision—ECCV 2020, Lecture Notes in Computer Science, Cham: Springer International Publishing, 2020, 18 pages.
Hinton, G., et al., "Using Fast Weights to Deblur Old Memories," Proceedings of the 9th Annual Conference of the Cognitive Science Society, 1987, 10 pages.
Hull, J., "A Database for Handwritten Text Recognition Research," IEEE Transactions on Pattern Analysis and Machine Intelligence 16, No. 5, May 1994, pp. 550-554.
Johnson, J., et al., "Perceptual Losses for Real-Time Style Transfer and Super-Resolution," published on arXiv.org as 1603.08155v1, Mar. 27, 2016, 18 pages.
Kim, B., et al., "Learning Not to Learn: Training Deep Neural Networks With Biased Data," 2019 IEEE/CVF Conference on Computer Vision and Pattern Recognition (CVPR), Long Beach, CA, USA: IEEE, 2019, pp. 9012-9020.
Kim, C., et al., "Imbalanced Continual Learning with Partitioning Reservoir Sampling," published on arXiv.org as 2009.03632v1, Sep. 8, 2020, 33 pages.
Kirkpatrick, J., et al., "Overcoming Catastrophic Forgetting in Neural Networks," Proceedings of the National Academy of Sciences 114, No. 13, Mar. 28, 2017, pp. 3521-3526.
Lecun, Y., et al. "Gradient-Based Learning Applied to Document Recognition," Proceedings of the IEEE, vol. 86, No. 11, Nov. 1998, pp. 2278-2324.
Li, D., et al., "Deeper, Broader and Artier Domain Generalization," 2017 IEEE International Conference on Computer Vision (ICCV), Venice, 2017, pp. 5542-5550.
Li, Z., et al., "Learning without Forgetting," published on arXiv.org as 1606.09282v3, Feb. 14, 2017, 13 pages.
Lopez-Paz, D., et al., "Gradient Episodic Memory for Continual Learning," 31st Conference on Neural Information Processing Systems (NIPS 2017), Long Beach, CA, USA, 2017, 10 pages.
Netzer, Y., et al., "Reading Digits in Natural Images with Unsupervised Feature Learning," NIPS Workshop on Deep Learning and Unsupervised Feature Learning, 2011, 9 pages.
Parisi, G., et al., "Continual Lifelong Learning with Neural Networks: A Review," Neural Networks 113, 2019, pp. 54-71.
Pellegrini, L., et al., "Latent Replay for Real-Time Continual Learning," IEEE/RSJ International Conference on Intelligent Robots and Systems (IROS), Las Vegas, NV, USA: IEEE, Oct. 25-29, 2020, pp. 10203-10209.
Prabhu, A., et al., "GDumb: A Simple Approach That Questions Our Progress in Continual Learning," Computer Vision—ECCV 2020, Springer International Publishing, 2020, 17 pages.
Rebuffi, S., et al., "iCaRL: Incremental Classifier and Representation Learning," IEEE Conference on Computer Vision and Pattern Recognition (CVPR), Honolulu, HI, IEEE, 2017, pp. 2001-2010.
Rumelhart, D., et al., "Learning Representations by Back-Propagating Errors," Nature 323, No. 6088, Oct. 1986, pp. 533-536.
Rusu, A., et al., "Progressive Neural Networks," published on arXiv 1606.04671v3, Sep. 7, 2016, 14 pages.
Xiao, T., et al., "Error-Driven Incremental Learning in Deep Convolutional Neural Network for Large-Scale Image Classification," Proceedings of the 22nd ACM International Conference on Multimedia, Orlando Florida USA: ACM, Nov. 3-7, 2014, pp. 177-186.
Yoon, J., et al., "Lifelong Learning With Dynamically Expandable Networks," published as a conference paper at ICLR 2018, 2018, 11 pages.
Zenke, F., et al., "Continual Learning Through Synaptic Intelligence," proceedings of the 34th International Conference on Machine Learning, Sydney, Australia, PMLR 70, 2017, 9 pages.
Zhang, R., et al., "The Unreasonable Effectiveness of Deep Features as a Perceptual Metric, " 2018 IEEE/CVF Conference on Computer Vision and Pattern Recognition, Salt Lake City, UT: IEEE, 2018, pp. 586-595.
Zhou, G., et al., "Online Incremental Feature Learning with Denoising Autoencoders," Proceedings of the 15th International Conference on Artificial Intelligence and Statistics (AISTATS) La Palma, Canary Islands, 2012, pp. 1453-1461.

* cited by examiner

500

Algorithm 1 Training procedure

Input: data stream $\mathcal{D}$, training set $\mathcal{S}_0$, initial weights $\theta^0$, learning rate $\alpha$ batch size $b$, memory $\mathcal{M}$ (or memory bucket $\mathcal{M}_c$), memory `type`

Output: weights $\theta^T$

Initialize: $\theta \leftarrow \theta^0$ for $t = 1, \ldots, T$ do

Receive $(\mathbf{x}, \mathbf{y})$ from $\mathcal{D}$ ▷ Receive annotated sample $B \leftarrow \{\text{RandomSample}(\mathcal{M}, b-1) \cup (\mathbf{x}, \mathbf{y})\}$ ▷ Create batch B $\theta^{t+1} \leftarrow \theta^t - \eta \nabla_\theta \mathcal{L}(B; \theta^t)$ ▷ Run gradient descent step $\mathcal{M}_y := \text{UpdateMemory}(\mathcal{M}, \mathbf{x}, \texttt{type})$ ▷ Update the memory for class $\mathbf{y}$

FIG. 5

600

Algorithm 2 Distance-based Memory Update procedure

```
function UpdateMemory(M, x, type)
    Input: Memory or memory bucket M, sample x,
            type of memory (max-global or min-cross-class)
    Output: updated memory bucket M
    M.Append(x)
    if M.IsFull() then
        if type is max-global then
            Find index i that solves Eq. (3)
        elseif type is min-cross-class then
            Find index i that solves Eq. (4)
        M.Remove(i)                ▷ Remove i_th element from the memory bucket
```

FIG. 6

ONLINE CONTINUAL LEARNING SYSTEM AND METHOD

FIELD

The present disclosure relates generally to machine learning, and more particularly to methods and systems for online continual learning methods for neural networks.

BACKGROUND

Processor-implemented models employing deep neural networks (DNNs) have shown good results in a broad variety of different tasks. However, their success generally has been based on the availability of large amounts of annotated samples that are repeatedly processed by the model in different epochs.

It is useful in many applications for a neural network-based model to be able to learn online after deployment using new data streams, such as those collected or generated from real-world data. This learning, referred to as online continual learning, is distinct from offline learning scenarios such as controlled, supervised learning scenarios that make deep learning effective.

However, conventional methods for processing new data streams for training a neural network model have not been suitably efficient, resulting in suboptimal online continual learning.

SUMMARY

Example embodiments herein provide, among other things, a method implemented by a processor in communication with a memory for processing a stream of samples for updating a machine learning model configured for performing a task. The method for samples received in the stream of samples for updating the machine learning model comprises: accessing from the memory a set of previous samples for training the machine learning model for performing the task; defining a set of combined samples that includes a sample received from the stream of samples and the set of previous samples accessed from the memory; training the machine learning model using the set of combined samples, the training the machine learning model defining an embedding space with the set of combined samples; determining whether to store or not store the sample received from the stream of samples in the memory with the set of previous samples based on distances between samples in the set of combined samples in the embedding space; and storing in the memory, with the set of previous samples, the sample received from the stream of samples when said determining determines to store the sample received from the stream of samples.

In embodiments, the distances comprise pairwise distances between the set of combined samples.

In embodiments, the method further comprises, when said determining determines to store the sample received from the stream of samples: identifying a sample from the set of previous samples stored in the memory; and replacing the identified sample in the memory with the sample received from the stream of samples.

In embodiments, the method further comprises: determining whether to store or not to store the sample received from the stream of samples in the memory based on the pairwise distances between the set of combined samples; wherein the sample received from the stream of samples replaces the existing previous sample based on said determining.

In embodiments, said determining comprises: selecting a subset of samples from the set of combined samples that maximizes a global distance across samples; and determining to store the sample received from the stream of samples in the memory if the sample received from the stream of samples is in the selected subset of samples.

In embodiments, the existing previous sample that is replaced is not in the selected subset of samples.

In embodiments, the selected subset of samples maximizes heterogeneity between the combined samples in the embedding space by selecting samples to be stored in the memory such that the points are maximally spread in the embedding space.

In embodiments, the task comprises a classification task; and said determining comprises: selecting a subset of the samples from the set of combined samples that minimize a sum of distances across samples from different classes; and determining to store the sample received from the stream of samples in the memory if the sample received from the stream of samples is in the selected subset of samples.

In embodiments, the existing previous sample that is replaced is not in the selected subset of samples.

In embodiments, the selected subset of samples is optimized for samples that are close to class boundaries of the classification task.

In embodiments, the stream of samples comprises one or more of images or features.

In embodiments, the machine learning model comprises a deep neural network model.

In embodiments, said training comprises learning according to a self-supervised learning objective.

In embodiments, the self-supervised learning objective is jointly optimized with a supervised objective in a multi-task setting; and the memory is shared by the self-supervised learning objective and the supervised objective.

In embodiments, optimizing the self-supervised learning objective uses a first encoder for encoding features stored in the memory; and optimizing the supervised objective uses a second encoder for encoding features stored in the memory.

In embodiments, the stream of samples is a stream of continuous samples.

In embodiments, each sample in the stream of samples comprises a class.

In embodiments, the task is a classification task; and the classification task is used for performing one or more of computer vision, autonomous movement, search engine optimization, or natural language processing.

Example embodiments further provide, among other things, methods for classifying a data input, comprising: receiving the data input by a machine learning model trained according to any of the above methods; processing, using the machine learning model, the received data input to determine a classification; and outputting the classification.

In embodiments, the method further comprises: partitioning the memory with the set of previous samples into a first memory region and a second memory region; and storing or not storing the new sample in the first memory region based on a preliminary determination; wherein said determining determines whether to store or not to store the sample received from the stream of samples in the second memory region based on distances between samples in the set of combined samples in the embedding space when the sample received from the stream of samples is not stored in the first memory region.

In embodiments, the preliminary determination is a determination other than a determination based on distances between the samples in an embedding space learned by the machine learning model.

In embodiments, the preliminary determination is based on one of a random sampling method and a reservoir sampling method.

In embodiments, the method further comprises: partitioning the memory with the set of previous samples into a first memory region and a second memory region; wherein said determining determines whether to store or not store the sample received from the stream of samples in the first memory region based on distances between samples in the set of combined samples in the embedding space; and storing or not storing the sample received from the stream of samples in the second memory region based on a subsequent determination when the sample received from the stream of samples is not stored in the first memory region.

Example embodiments further provide, among other things, and online learning system comprising: a memory configured to store a plurality of samples; and a machine learning model for performing a task, the machine learning model being implemented by a processor in communication with the memory. The processor is configured to: receive a new sample; train the machine learning model using combined samples including the new sample and the stored plurality of samples; and store or not store the new sample in the memory based on distances between the combined samples in an embedding space learned by the machine learning model.

In embodiments, the machine learning model comprises a deep neural network model.

In embodiments, the distances comprise pairwise distances between the samples.

In embodiments, said storing the new sample in memory comprises replacing an existing previous sample in the memory with the new sample; wherein the method further comprises: determining whether to store or not store the new sample in the memory based on pairwise distances between the samples; wherein the new sample replaces the existing previous sample based on said determining.

In embodiments, said determining comprises: selecting a set of the samples that maximizes a global distance across samples; and determining to store the new sample in the memory if the new sample is in the selected set; wherein the existing previous sample that is replaced is not in the selected set.

In embodiments, the selected set maximizes heterogeneity between the combined samples in the embedding space.

In embodiments, the task comprises a classification task; and said determining comprises: selecting a set of the samples that minimizing a sum of distances across samples from different classes; and determining to store the new sample in the memory if the new sample is in the selected set; wherein the existing previous sample that is replaced is not in the selected set.

In embodiments, the memory comprises a first region and a second region; and the processor is configured to: store or not store the new sample in the first memory region based on a first determination other than a determination based on distances between the samples in an embedding space learned by the machine learning model; and if the new sample is not stored in the first memory region based on the first determination, store or not store the new sample in the second memory region based on the distances between the samples in the embedding space learned by the machine learning model.

According to a complementary aspect, the present disclosure provides a computer program product, comprising code instructions to execute a method according to the previously described aspects; and a computer-readable medium, on which is stored a computer program product comprising code instructions for executing a method according to the previously described embodiments and aspects. The present disclosure further provides a processor configured using code instructions for executing a method according to the previously described embodiments and aspects.

Other features and advantages of the embodiments will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the embodiments to only the illustrated and described embodiments or to how they can be made and used. Further features and advantages will become apparent from the following and, more particularly, from the description of the embodiments as illustrated in the accompanying drawings, wherein:

FIG. 5 shows an example online continual learning method for updating a neural network model using distance-based criteria according to example embodiments;

FIG. 6 shows an example distance-based memory updating method according to example embodiments for the online continual learning method of FIG. 5;

In the drawings, reference numbers may be reused to identify similar and/or identical elements.

DETAILED DESCRIPTION

Figure 1:
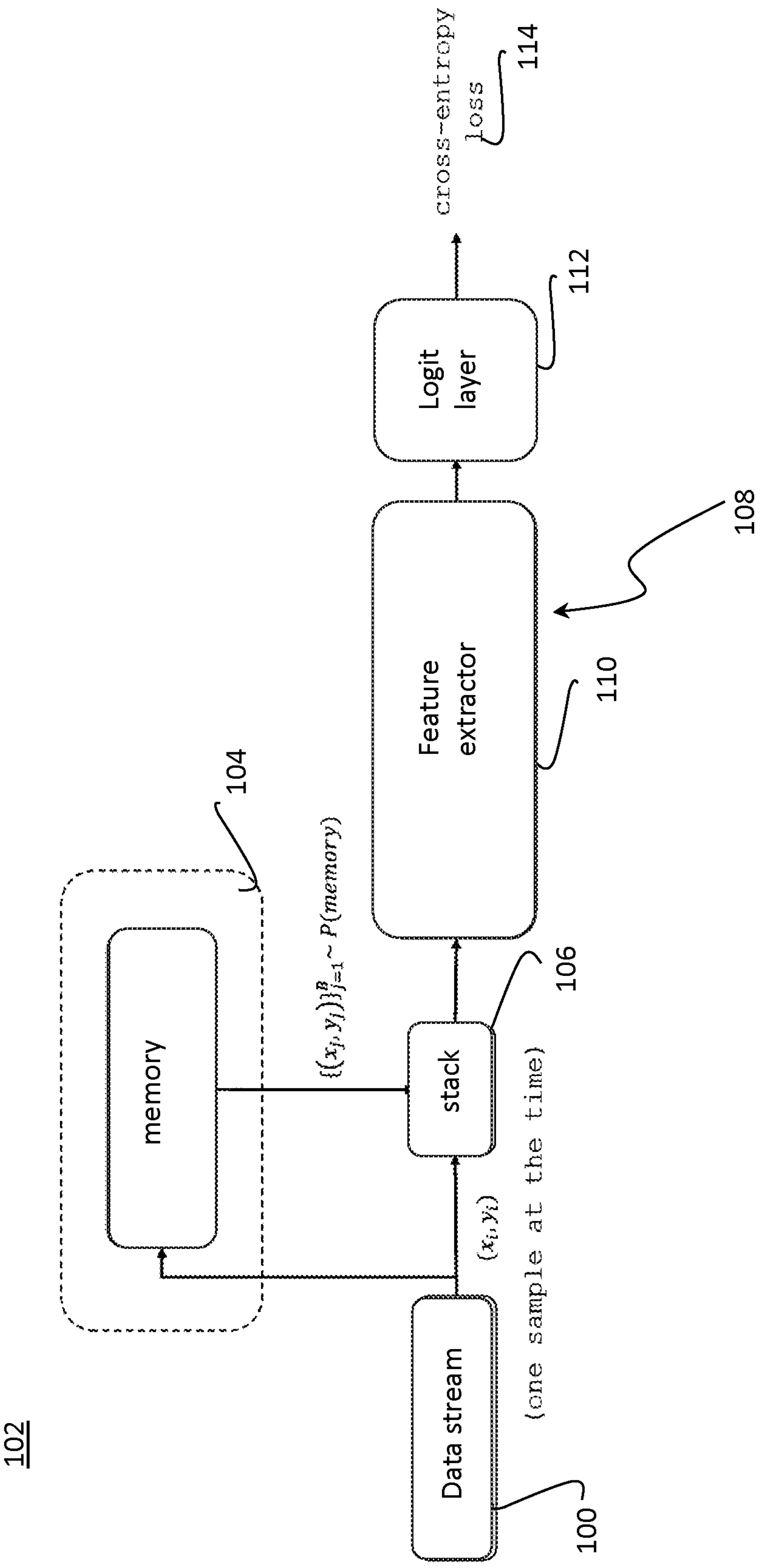
FIG. 1 shows an example data flow from a time-varying data stream for example data processing methods for memory-based online continual learning.

Models incorporating deep neural networks tend to perform well when they can be trained via multiple passes on large, annotated datasets. However, such models may not perform as well when they are trained in an online fashion, such as by processing samples from new data streams in online continual learning.

A significant problem to be addressed in online continual learning is how to treat new data streams that are introduced to online learning systems and used for updating the training of neural network models. For instance, in online continual learning, new data streams of samples (data points), which can be generated in various ways, are provided to the online learning system. These new data can supplement previously stored (old) samples in memory, providing an updated dataset for training the model. The new samples can then be stored along with old samples in the memory, where the new samples become "old" samples with respect to future incoming data streams.

When the memory is full, it needs to be determined whether to store new samples at the expense of deleting some prior-stored information. It has been found that a suboptimal determination can negatively affect the trained model's efficacy.

One such deficiency in online continual learning is so-called catastrophic forgetting, where without repeated exposure, conventional learning systems will inevitably tend to forget the older patterns they learned. It has been shown that a small memory of past datapoints can help minimize forgetting older patterns of the learned model. However, even using such techniques current methods for processing data for training deep learning models can be vulnerable to catastrophic forgetting, and thus may not be suitably effective in handling new data streams.

Thus, it is useful to address the problem of catastrophic forgetting when learning from data streams as they are revealed. Some previously available methods rely on relatively simple rules (e.g., treating the memory as a first-in-first-out (FIFO) queue) for updating memory. Other methods attempt to mitigate catastrophic forgetting of previously learned patterns by relying on methods with randomized strategies, such as random sampling methods or reservoir sampling methods, which are explained in more detail herein. However, each of these methods in some conditions can become inadequate for addressing the catastrophic forgetting problem.

Example embodiments herein provide, among other things, methods and systems for updating a memory of samples for online continual learning of a neural network model. Such methods may be used in some embodiments when the memory is at full capacity, for instance such that the only way to store new samples may be to delete some of the old ones, although it is contemplated that example methods may be used in other embodiments when a memory is at less than full capacity. Example embodiments can further provide online continual learning methods that incorporate one or more memory updating methods. Memories for an online learning system that are updated depending on how the memories are partitioned using example methods are also provided.

Example processing methods for new data streams of samples provided herein can make decisions regarding whether to store new samples in memory, or alternatively not store (e.g., by rejecting storing or discarding) the new samples, by analyzing where the memory samples lie in the embedding space learned by the model at hand. Cases where randomized memories used by some conventional approaches fail where the data stream shows distributional shifts, such as but not limited to where the stream of data is dominated by a single distribution (unbalanced) can be addressed by example processing methods herein.

Example methods herein can improve the effectiveness of online continual learning approaches when the data stream that a model needs to process is not homogeneous (e.g., it is defined by different domains or otherwise has large variation, i.e., a data stream that is made up of dissimilar samples). Some example data processing methods exploit novel update criteria for adaptive data substituting (swapping) based on distances, e.g., pairwise distances, between data points in the space of learned representations. For instance, some example methods can favor storing diverse samples, such as by maximizing distances across points (inter-sample distance). Other example methods can favor ambiguous samples as closer to class boundaries, such as by minimizing distances across points from different classes (cross-class or inter-class distance).

Example distance-based memory updating methods can operate alone or in combination. In some embodiments, one or more additional memories can be adopted, e.g., by providing an additional memory or by partitioning a memory, to incorporate one or more of the above distance-based methods in combination with one or more conventional approaches such as random or reservoir sampling. Such hybrid methods can provide benefits when the distributions are balanced or unbalanced.

Example methods can provide novel techniques to use memory (e.g., in an online learning system) in replay-based online continual learning from data streams. The need to continuously learn new patterns is ubiquitous in machine learning applications. Online continual learning techniques can be classified into various categories including architecture growing (increasing the model capacity over time), regularization (constraining the optimization problem), and experience replay (storing a memory bank with old samples). Example methods herein provide, among other things, decision rules that concern a memory of samples from the past, and can be applied in any online continual learning framework that involves the usage of a memory. As a nonlimiting example, methods provided herein can replace simple memory updating methods such as but not limited to those disclosed in Hayes et al., "Remind your neural network to prevent catastrophic forgetting," In Proceedings of the European Conference on Computer Vision (ECCV), 2020, or those by Prabhu et al., "A simple approach that questions our progress in continual learning," In Proceedings of the European Conference on Computer Vision (ECCV), 2020.

Example online continual learning methods provided herein can be implemented using methods generally analogous to rehearsal/replay methods as disclosed in Parisi et al., "Continual Lifelong Learning with Neural Networks: A Review," Neural Networks, 113:54-71, 2019. In rehearsal/replay methods, samples from the past are stored into a memory, and are regularly fed to a current model together with the new samples from the world, allowing one to learn new information without forgetting old patterns (e.g., as disclosed in Hinton et al., "Using Fast Weights to Deblur Old Memories," In Annual Conference of the Cognitive Science Society, 1987, Lopez-Paz et al., "Gradient Episodic Memory for Continual Learning," In Proceedings of Advances in Neural Information Processing Systems (NIPS), 2017; Chaudry et al., "Efficient Lifelong Learning with A-GEM," In Proceedings of the International Conference on Learning Representations (ICLR), 2019; Chaudry et al., "Using hindsight to anchor past knowledge in continual learning," arXiv:2002.08165 [cs.LG], 2020; Hayes et al., "Memory Efficient Experience Replay for Streaming Learning," 2019; Aljundi et al., "Online continual learning with no task boundaries," 2019; Hayes et al., "Remind your neural network to prevent catastrophic forgetting," In Proceedings of the European Conference on Computer Vision (ECCV), 2020; and in Prabhu et al., "A simple approach that questions our progress in continual learning," In Proceedings of the European Conference on Computer Vision (ECCV), 2020).

Example online continual learning methods herein are generally applicable to tasks performed by neural network models including but not limited to supervised or self-supervised tasks, or a combination of supervised and self-supervised tasks (e.g., jointly optimized based on supervised and self-supervised objectives). Joint optimization may share the memory and encode features in the memory based on the supervised/self-supervised objectives.

Example tasks include, but are not limited to, classification-based tasks. Non-limiting example applications that can benefit from example online continual learning methods include: house or other personal robots, whose underlying knowledge needs to be adapted to endlessly varying house environments while not forgetting important previous training; self-driving cars or other vehicles, whose processor-based vision modules may need specific adjustments according to the specific environments (e.g. urban/rural, private/public, etc.) they need to engage with; processor-based language models such as but not limited to natural language processing (NLP) models, which should account for new information that is continually generated; processor-implemented search engines that use online learning methods; processor-implemented algorithms, e.g., by a server or client device, that process social network data flows, which are extremely heterogeneous; and many others.

Experiments demonstrate that example methods can be more effective than conventional methods for processing heterogeneous data streams, which is significant for many practical applications. Experiments described herein on standard computer vision benchmarks, a nonlimiting example application, confirm the validity of example approaches in scenarios when the distributions that underlie the data streams change throughout the training trajectory.

For purposes of explanation, examples and specific details are set forth in order to provide a thorough understanding of the embodiments. Embodiments, as defined by the claims, may include some or all of the features in these examples alone or in combination with the other features described below, and may further include modifications and the equivalence of the features and concepts described herein. The following description will refer to FIGS. 1-9, explaining embodiments and technical advantages in detail.

Catastrophic Forgetting in Online Continual Learning

When processing samples from the real world for online continual learning, it is desirable for a machine learning algorithm, such as a deep neural network (DNN) or other neural network (model), to learn in an online fashion from new samples and to process temporally correlated samples. This setting is significantly different from (for instance) controlled, supervised learning scenarios that conventionally make deep learning effective, such as large, independent, and identically distributed (i.i.d.) datasets that can be processed offline. However, there continues to exist a need for methods that allow efficient training of neural networks by exposing them to continuous data streams.

An issue in training neural network models online is so-called catastrophic forgetting. With catastrophic forgetting, if a neural network model is provided with annotated samples from novel classes, or from samples associated with known classes but from different data distributions (domains), the neural network model will generally forget the older patterns. It is desirable to mitigate catastrophic forgetting to better enable neural network models to learn online from data streams (online continual learning) as well as in an (e.g., standard) offline fashion.

Known methods and systems for online learning employ a memory bank or buffer (memory) of past samples that is updated after each new training sample. Generally, storing old samples in the memory and re-training the neural network model on the old samples when they need to be used can mitigate the forgetting of previously learned capabilities, and can lead to improved results in tasks such as but not limited to image classification tasks.

An example data flow from a time-varying data stream 100 for a data processing method in conventional memory-based online continual learning, e.g., online learning by an online learning system 102, is shown in FIG. 1. An incoming stream of samples $(x_t, y_t)$ is processed one sample at a time for each time step t from the data stream 100 are stored in a memory 104 of constrained size until the memory becomes full. The memory 104 can be, for instance, any suitable memory or memory buffer that can be accessed by a processor (not shown) for occasionally resampling for training a machine learning model such as a neural network deep learning model. Each sample, for instance, can represent a data input (of any suitable data type) $x_t$ and an associated class $y_t$. Such annotated samples can be provided from any external or internal source, e.g., known sources of data provided in the field for supervised learning applications or obtained via other means or sources.

The incoming stream of samples can also be stacked at stack 106 with a set of previous samples accessed from the current contents of the memory 104 at each time step t to form a set of combined samples, e.g., a training mini-batch, for a neural network model 108 implemented by the processor, which model 108 can include feature extraction 110 and logit layer 112 blocks. The space where vectors from the feature extraction 110 lie is referred to as an embedding space. The embedding space represents high-dimensional data (e.g., text, images, items) in a low-dimensional representation (e.g., using real vectors). That is, the embedding space is a multi-dimensional space where the vectors produced by the feature extractor 110 exist. This embedding space is defined with the set of combined samples during training of the neural network model. In such a space, relationships between the different vectors can be evaluated (for example, by computing a Euclidean distance to measure how close the vectors (or items in the high-dimensional space) are related). The neural network model 108 can be configured for any suitable application, and can be trained using any suitable training methods, examples of which will be appreciated by those of ordinary skill in the art.

If there is space left in the memory 104, the new sample $(x_t, y_t)$ from the data stream 100 can be included in the memory. However, if the memory 104 is determined to be full (e.g., insufficient memory space, or it is otherwise determined that the memory should not store a greater amount of data), the data processing method determines whether the new sample $(x_t, y_t)$ should be or should not be incorporated into the memory. If it is determined that the new sample should be incorporated into the memory 104 (that is, it is determined to store the sample received from the stream of samples), the processing method then also identifies which sample should be removed from the memory in order to make room for the new sample (that is, which sample is to be replaced with the received sample from the stream of samples).

Thus, in addition to determining whether a new sample $(x_t, y_t)$ should be stored in the memory, the data processing method also determines which samples of old or new memories already stored in the memory should be retained in the memory 104, and which samples should be deleted from the memory or otherwise discarded. Conventional data processing methods for learning from streaming data rely on extremely simple, naïve strategies. One conventional memory updating method is first-in-first-out (FIFO), which results in catastrophic forgetting.

Other conventional methods attempt to reduce catastrophic forgetting by randomly substituting samples from the memory 104 to open space as new ones become available. Still other conventional memory update methods rely on reservoir sampling. Although these more recent strategies can sufficiently approximate stationary data distributions, they are still vulnerable to, among other things, nonstationary data distribution, such as may result from distribution shifts.

Distribution shifts may result in imbalances across domains. For example, consider a robot that receives a large number of samples from a specific environment (an example domain) A, such as a particular room of a house, and then only a limited number of samples from a different environment or situation (domain) B, such as a different room of the house. Since the two environments A and B are considered equally important, it is not desirable for the environment B to be underrepresented in a set of samples stored in memory for training a machine learning model. Other example domains include visual conditions, such as may be associated with different environments, or weather conditions, for outdoor agents.

Another example imbalance due to distribution shifts may be across classes. For example, an image classification application may receive (or generate) a large number of samples that are pictures of dogs but a limited number of samples of pictures that are cats. However, both classes may be considered equally important.

Example methods disclosed herein recognize that, when dealing with nonstationary distributions, as typically experienced in practical applications, data processing methods can consider additional criteria beyond merely memory size and number of samples. Thus, in example methods, for new samples received from a data stream, a decision on whether to store the new sample in the memory buffer can depend on the current model (that is, the current learned representation), the current memory buffer, as well as the new sample itself. Such methods go beyond mere randomness, as in more recent approaches, to improve online continual learning methods.

Some example methods can make decisions on how to update a memory by evaluating the data point's location in the space of the representation learned by the current model (that is, the learned embedding space). Various example solutions are provided.

Some example methods update the memory based on its heterogeneity, such as by optimizing for a memory where points are maximally spread in the space of the representation learned by the current model. Such example update methods may be employed to select a subset of samples that maximize the global distance between memory points (e.g., by maximizing the distances between vectors in the embedding space of the current model). A rationale behind this example approach is that a memory that maximizes the heterogeneity of the feature space (e.g., heterogeneity between the samples in the embedding space) would be less likely to forget rare-event and under-represented domains. Further, optimizing for large distances across samples in memory can be equivalent to optimizing for a diverse memory (i.e., storing dissimilar samples uniformly over time).

Other example solutions optimize for points that are close to the class boundaries of a classification problem at hand, therefore selecting a subset of samples to minimize the inter-class distance between memory data points. A rationale behind this approach is that points in close proximity to the decision boundaries might be more important than others depending on each task.

Example data processing methods for memory management herein can be generally applied to any online continual learning solution for neural network models that relies on a memory for storing a set of samples for training a machine learning model. Example methods do not require any additional hyper-parameters.

Example distance-based data processing methods perform significantly better than methods used by state-of-the-art approaches in the case where the training distribution changes significantly during training. In such contexts, it is shown that competing data processing methods fail in storing samples from different domains in an optimal fashion, resulting in a compromised performance. On the other hand, present example methods can maintain improved performance, for instance, in heavily unbalanced domain scenarios while also maintaining comparable performance in balanced domain scenarios.

While some example applications described herein with reference to experiments are directed to online continual learning for computer vision tasks, it will be appreciated that example data processing methods can be extended to online continual learning of models for performing other tasks, such as but not limited to natural language processing (NLP) tasks, in which the underlying model it extends is fully differentiable.

Online Continual Learning Method: Problem Formulation

In an example online continual learning method, given a stream of data tuples (x, y) one is interested in learning the parameters $\theta$ of a model $f_\theta$ for solving a task $\mathcal{T}$. Model $f_\theta$ is considered to be composed of at least two parts: (a) an encoder function $g(x; \theta_1)$ with weights $\theta_1$ that embeds each input datapoint x into a feature vector $g(x; \theta_1) \in \mathbb{R}^d$; and (b) a linear classifier with weights $\theta_2$ that computes the likelihood of those feature vectors belonging to either one of a set of K possible classes. In other words, one considers:

$$f_\theta(x)=\theta_2 \cdot g(x;\theta_1).$$

In the above equation $g(x; \theta_1)$ is often referred to in the art as a backbone network for a deep model.

The task $\mathcal{T}$ can be considered as a classification task over K classes. An example model to be trained is a neural network trained in a supervised way using a cross-entropy loss via backpropagation (as shown in FIG. 1 at 114). Nonlimiting examples of neural network models that can be trained using example methods are disclosed in Rumelhart et al., "Learning internal representations by error propagation," MIT Press, 1986, pages 318-362, which is incorporated by reference herein.

It is further assumed that the model has access to a memory $\mathcal{M}$ of up to N samples. For illustrating an example embodiment, and without loss of generality, it can be further assumed that the memory bank (or memory buffer) is partitioned in K buckets of size N/K; that is, it can contain (up to) a fixed number of samples per class. For instance, the bucket for class c can be referred to as $\mathcal{M}_c$, c=1 . . . K. However, it is also contemplated that the size of each bucket can be arbitrary, e.g., varying according to specific applications, environments, etc. For example, it is possible to use larger buckets for classes that require more samples to be learned properly.

In some example embodiments training may take place by optimizing both supervised and self-supervised objectives. For instance, both objectives may share the memory. The supervised objective may use a first encoder for encoding features stored in the memory, while the self-supervised objective may use a second encoder for encoding features stored in the memory.

Due to the finite size of (number of possible samples in) the memory, new data samples replace existing samples stored in the memory, e.g., during online training. As explained above, online continual learning of the model using such updated memory can result in catastrophic forgetting.

Figure 2A:
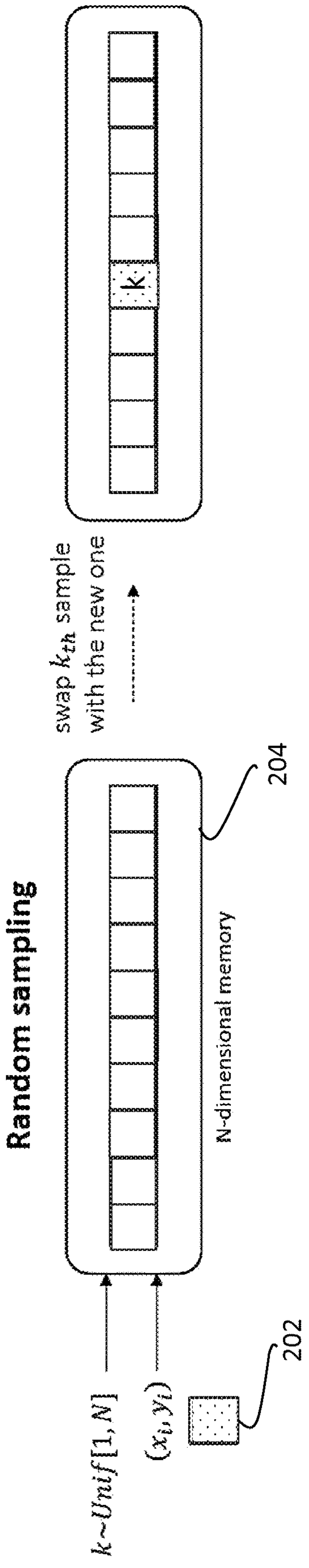
FIGS. 2A-2B show data flows for example random sampling and reservoir sampling techniques, respectively.
Figure 2B:
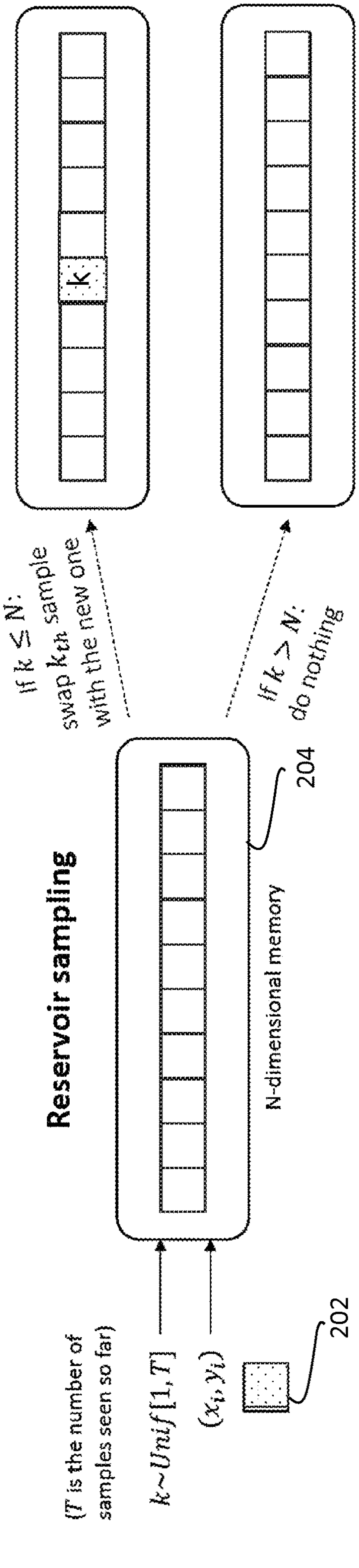

Referring now to FIGS. 2A-2B to formalize this problem, let datapoint $(x_t, y_t)$ be the sample 202 and corresponding class label presented to an online learning system (such as system 102) including an N-dimensional memory 204 at time-step t<T, where T is the number of samples seen so far. Let each such data point to be sampled by a nonstationary distribution $\mathcal{P}^t(X, Y)$; i.e., the distribution is shifting over time and $(x_t, y_t) \sim \mathcal{P}^t(X, Y)$. This datapoint $(x_t, y_t)$ can be provided from any suitable internal or external source of annotated data.

FIG. 2A illustrates a random sampling approach. Random sampling approaches, such as those disclosed in Hayes et al., "Remind your neural network to prevent catastrophic forgetting," In Proceedings of the European Conference on Computer Vision (ECCV), 2020, attempt to address the catastrophic forgetting problem by: (i) defining a training batch by combining a bunch of samples from the memory 204 and the new datapoint, e.g., at stack 106; (ii) optimizing a given loss with respect to the current batch, e.g., using the neural network model 108; and (iii) randomly replacing a sample (e.g., $k^{th}$ sample) from the bucket associated with class y with the new sample. In such methods, under a data distribution that changes over time, random sampling would permanently replace samples drawn from distributions at earlier time-steps $\mathcal{P}^t(X,Y)$ with the most recent ones.

On the other hand, reservoir sampling approaches, e.g., such as disclosed in Chaudry et al., "On Tiny Episodic Memories in Continual Learning," arXiv:1902.10486 [cs.LG], 2019, and in Pellegrini et al., "Latent replay for real-time continual learning," 2020, adjust the probability of a sample to be replaced with a new one with respect to the number of samples seen so far. Referring to the formulated model, given a memory of size N, and given a new sample 202 from the data stream $(x_t, y_t)$, the probability of substituting a sample from the memory 204 with the new one is N/T, where T is the number of points (samples) received so far.

For instance, in the reservoir sampling method shown in FIG. 2B, sample k can be a random integer such that $k \in T$. If $k \leq N$ the $k^{th}$ sample is swapped with the new sample $(x_t, y_t)$, but if k>N, it is not. With this method, the probability of replacing a sample decays linearly in accordance with the time step t<T. This sampling technique ensures that each sample has an equal probability of having been present in the reservoir (N-dimensional memory 204) at any time t.

With both random and reservoir sampling, every sample in the memory 204 is treated equally. In other words, the probability of removing a datapoint $x_A$ or $x_B$ from the memory 204 is the same for every couple (A,B).

Although such memory update approaches can sufficiently represent stationary distributions, such approaches are suboptimal when the distribution is shifting over time. In that case, under random replacement the memory 204 will end up storing only data points from the recent past. Due to catastrophic forgetting and the fact that conventional models are brittle in handling distributional shifts, the model θ will generally perform suboptimally on samples from distributions that are no longer represented in the memory 204.

While this issue is mitigated to an extent with reservoir sampling, the same importance is still attributed to each sample, and the probability of retaining samples associated with rare events can become very small. For example, in a scenario where the number of samples observed is very large, and one receives a small number of very interesting samples, the probability of retaining them with reservoir sampling will be undesirably low. In other scenarios, where the data stream may be dominated by samples that are not particularly valuable for the given task, using reservoir sampling, they will regardless dominate the memory.

Example methods can address such concerns by determining memory updates for online continual learning according to a distance between samples, e.g., based on the point location in the learned feature space. Using the model formulation above, distances may be computed in example methods in the embedding space where the vectors $g(x; \theta_2)$ lie. For illustrating example embodiments, two example distances, global distance and cross-class distance, will now be defined.

Global distance: Given a set $\mathcal{M}$ of samples stored in memory, the global distance $\mathcal{H}_g$ can be defined as the sum of distances across all pairs of points in the embedding space. This can be formally defined, for example, as:

$$\mathcal{H}_g = \sum_{x_i, x_j \in \mathcal{M}_c} d(g(x_i), g(x_j)), \tag{1}$$

Cross-class distance: Given a set $\mathcal{M}$ of samples stored in memory, the cross-class or inter-class distance $\mathcal{H}_{ic}$ can be defined as the sum of distances across all pairs of points from different classes in the embedding space. This can be formally defined, for example, as:

$$\mathcal{H}_{ic} = \sum_{x_i, x_j \in \mathcal{M}_c} [\![(y_i \neq y_j) \cdot d(g(x_i), g(x_j)), \tag{2}$$

In Equations (1) and (2) above, d(.,.) is an arbitrary distance function. Some example methods use the cosine distance for the distance function. However, other distance functions can be used.

Set difference: A set difference operation in example methods can be defined as $A \backslash B = \{x : x \in A \text{ and } x \notin B\}$.

Figure 3:
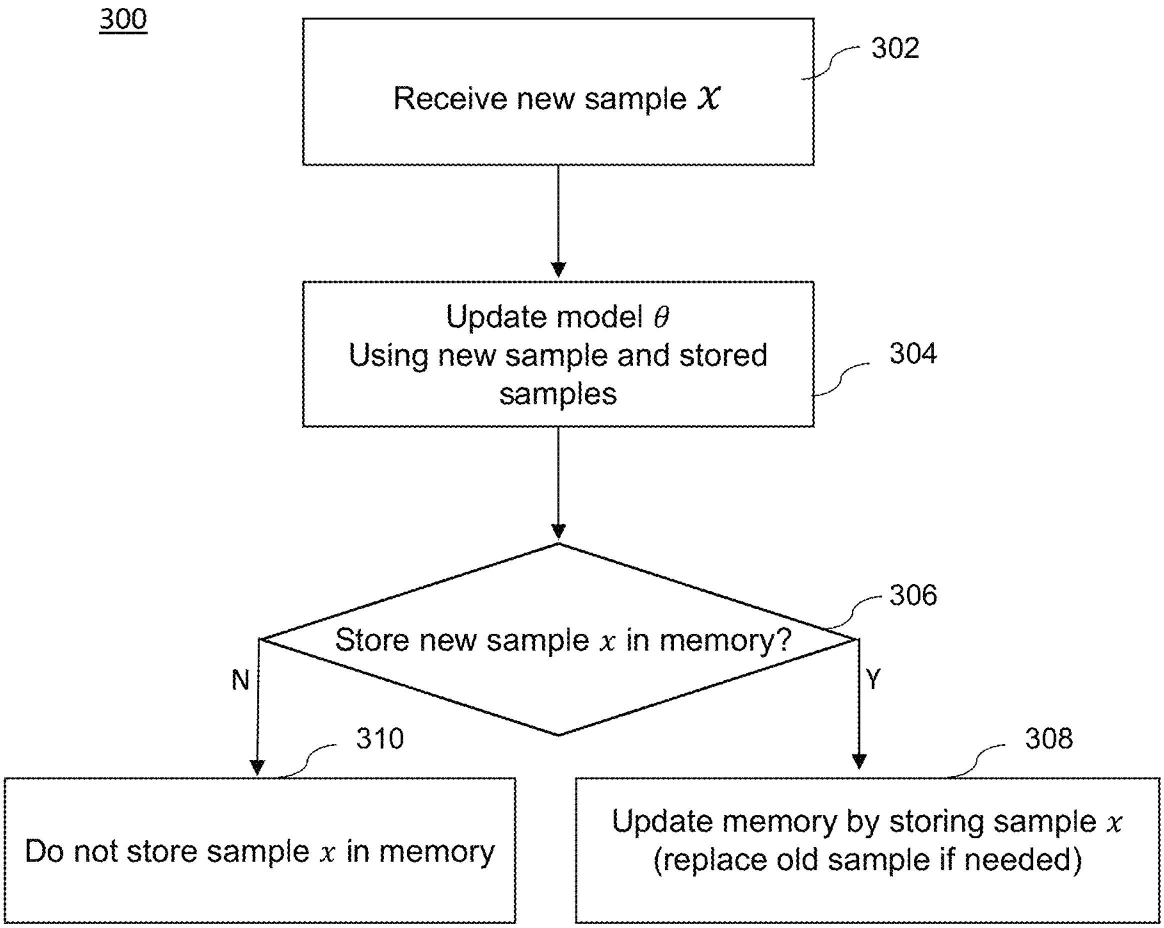
FIG. 3 shows an example online continual learning method according to example embodiments.

FIG. 3 shows an example online continual learning method 300. A new sample x is received at 302 from class c. The sample x, in combination with the stored samples to provide an updated dataset, is used at 304 to update the current model parameters θ, e.g., by training the neural network model using training methods known in the art, for example via gradient descent.

Then, it is determined at 306 whether to store the new sample x in the memory $\mathcal{M}$ or not. In some example methods, if the memory $\mathcal{M}$ is partitioned in class-specific buckets, the determining at 306 includes determining whether to store the sample x in the memory bucket $\mathcal{M}_c$ or not. If it is determined at 306 that the sample is to be stored in the memory $\mathcal{M}$, the memory is updated at 308 by storing the sample. If not, the sample can be not stored (e.g., rejected and/or discarded) at 310.

Figure 4:
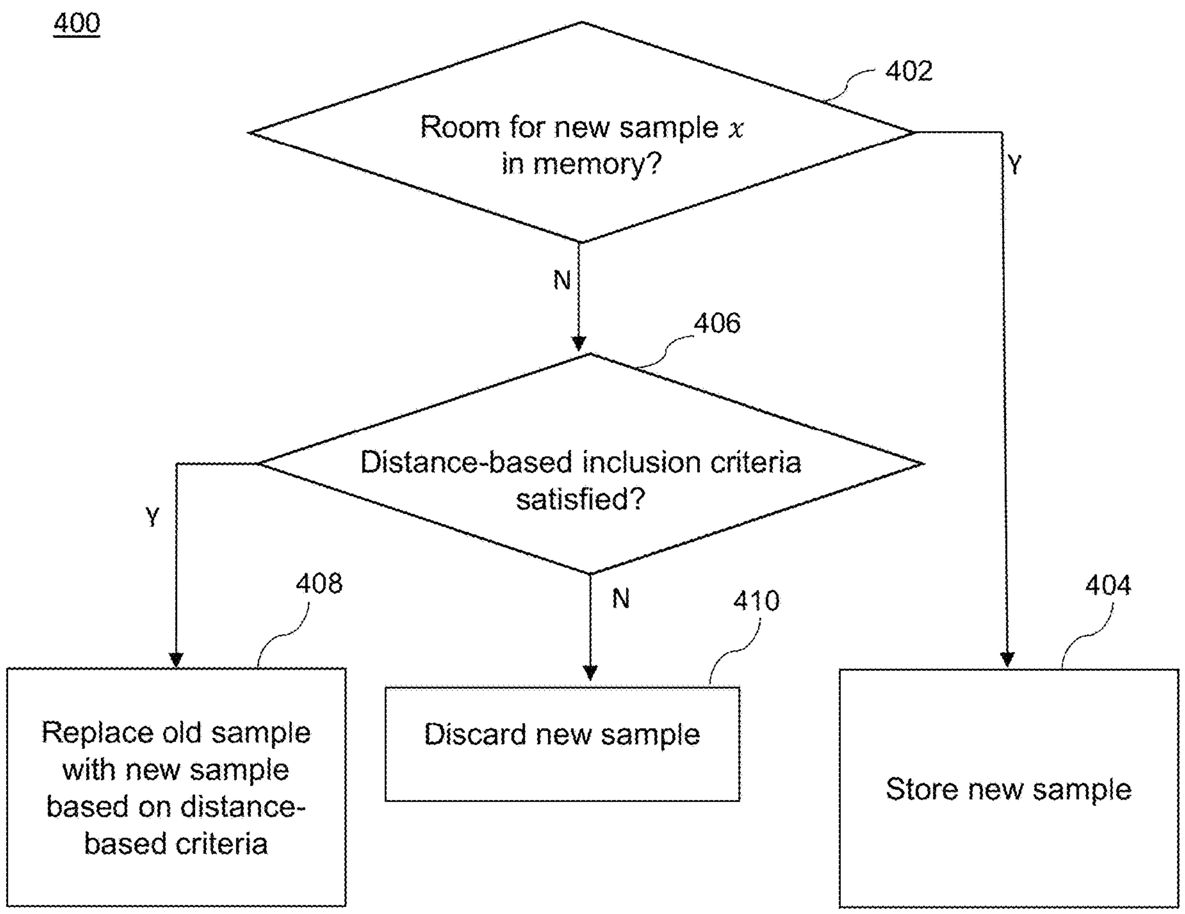
FIG. 4 shows an example method for determining whether a new sample is to be stored in memory.

FIG. 4 shows an example method 400 that can be used for the determination 306. It is first determined at 402 whether room for new samples exists in the memory (e.g., without the need to replace an existing sample). For instance, if $|\mathcal{M}|<N$ (or for class-specific buckets, if $|\mathcal{M}_c|<N_c$), the example method determines at 402 that there is still room for new samples, and the memory (or memory bucket) can be updated at 404, e.g., by storing the new sample, such as by simply appending the new sample x, i.e., $\mathcal{M} := \mathcal{M} \cup x$ (resp: $\mathcal{M}_c := \mathcal{M}_c \cup x$).

However, if it is instead determined at 402 that the memory (resp: memory bucket) is full ("full" herein refers to being restricted from storing a greater number of samples, due to available capacity, a determined limit for certain samples (e.g., samples from one or more recognized domains), or other reason), a further determination is made at 406 as to whether the new sample x satisfies inclusion criteria for a selected subset of samples based at least on the point location in the learned feature space. A determination is made at 406 that the new sample should be stored if and only if the new sample also satisfies this inclusion criteria for the selected subset of samples. If so, the new sample x is added to the memory, replacing an existing sample, to update the memory at 408. If not, the new sample is not stored (e.g., rejected and/or discarded) at 410. Example criteria based on global distance and cross-class distance are formalized below.

Optimizing for maximum global distance: This example criteria is based on the goal of obtaining a memory that maximizes global distance in the embedding space, e.g., as defined in Equation (1), at regular updates, such as but not limited to every update. In an example method according to such criteria, the global distance as defined in Equation (1) is computed for all sets $\{\mathcal{M}\cup x\}\backslash x_k$, for every element $x_k \in \{\mathcal{M}\cup x\}$. Formally, the maximization problem in Equation (3), below, can be solved:

$$\underset{k}{\operatorname{argmax}}\,\mathcal{H}_k := \sum_{x_i, x_j \in \{\mathcal{M}\cup x\}\backslash x_k} d(g(x_i), g(x_j)), \tag{3}$$

for all samples $x_k \in \{\mathcal{M}\cup x\}$. If the selected subset of samples that maximizes Equation (3) does not contain the new sample x, then the new sample is not stored (e.g., rejected or discarded) at 410. If the maximizing set does contain the new sample x, it is determined at 406 that the new sample should be stored in memory, in which case the memory sample $x_k \in \mathcal{M}$ that is not contained in the set that maximizes Equation (3) is removed from memory, and the new sample x takes its place at memory at memory updating step 408. The same procedure can be applied at the memory bucket level if the memory is partitioned (e.g., evenly, arbitrarily, etc.), in which case $\mathcal{M}_c$ is substituted for $\mathcal{M}$ in the notation above.

Optimizing for minimum inter-class distance: The goal of this criteria is obtaining a memory that minimizes inter-class distance, e.g., as defined in Equation (2), at every update. In an example method according to such criteria, the inter-class distance as defined in Equation (2) is computed for all sets $\{\mathcal{M}\cup x\}\backslash x_k$, for every element $x_k \in \{\mathcal{M}\cup x\}$. Formally, one needs to solve the following minimization problem:

$$\underset{k}{\operatorname{argmin}}\,\mathcal{H}_k := \sum_{x_i, x_j \in \{\mathcal{M}\cup x\}\backslash x_k} [\![ (y_i \neq y_j) \cdot d(g(x_i), g(x_j)), \tag{4}$$

for all samples $x_k \in \{\mathcal{M}_c \cup x\}$. In other methods, each sample $x_i$ can be associated with its closest representative from other classes, and equations (2) and (4) can be modified accordingly.

If the selected subset of samples that minimizes Equation (4) does not contain the new sample x, then the new sample is not stored (e.g., rejected or discarded) at 410. If the minimizing set does contain the new sample x, it is determined at 406 that the new sample should be stored in memory, in which case the memory sample $x_k \in \mathcal{M}$ that is not contained in the set that minimizes Equation (4) is removed from memory, and the new sample x takes its place at memory at 408. The same procedure can be applied at memory bucket level, if the memory is partitioned.

The optimization of the global-distance maximization (Equation (3)) distills to finding the sample that contributes less to the total sum. Analogously, the optimization of the inter-class minimization (Equation (4)) distills to finding the sample that contributes more to the total sum.

To more efficiently solve these optimizations, some example determination methods store a running distance matrix $\mathcal{A} \in \mathbb{R}^{N\times N}$ that stores all pairwise distances $d(g(x_i), g(x_j))$, for every pair of elements $x_i, x_j \in \mathcal{M}$. In principle, this allows one to solve the optimization problem of Equations (3) and (4) in $\mathcal{O}(N)$, by directly computing N sums. In example methods the example running distance matrix $\mathcal{A}$ is kept up to date; that is, substituting a memory sample $x_i$ with the new datapoint x implies also updating the row and column of matrix $\mathcal{A}$ corresponding to $x_i$. The distances are computed in the space of the learned representation, and thus they can become outdated.

In some example operations, the distances can be updated at every training step. In other example operations, the distances can be updated after batches of training steps, which may be useful to reduce computational overhead if the memories being used are very large.

An example online continual learning (or training) method 500 performed by a processor fora neural network model including a distance-based memory update is set out in FIG. 5. The neural network model, e.g., model 108, may be embodied in any suitable processor-based model configured for performing a task. Nonlimiting example tasks for neural network models to be trained include classification tasks (with or without labels being present) for various applications such as but not limited to computer vision, natural language processing, motion prediction/forecasting, etc.

An example distance-based memory update procedure 600 based on global distance and/or cross-class distance is set out in FIG. 6. It will be appreciated that the general distance-based memory update procedure in FIG. 6 can be easily configured to provide global distance-based memory updates or cross-class distance-based memory updates exclusively, e.g., by pre-selecting the memory type. As explained in more detail below with respect to FIG. 7, global distance and cross-class distance can also be considered in combination, and/or in combination with other memory updating methods in the art. Such methods are referred to herein as hybrid memory updating methods.

In the example online continual learning method in FIG. 5, data stream $\mathcal{D}$, training set $\mathcal{S}_0$, initial weights $\theta^0$, learning rate $\alpha$, batch size b, memory $\mathcal{M}$ (or memory bucket $\mathcal{M}_c$) and memory type (e.g., (global distance-based (max-global) or cross-class distance based (min-cross-class)) are input from any suitable source. The defined output is model weights $\theta^T$. Weights are initialized. For each time step t=1, . . . , T, an annotated sample (x, y) for training the model is received from any suitable source, including but not limited to known sources of supervised learning data. Batch B is created from the memory (or memory bucket) and the annotated sample by random sampling. A model optimization (e.g., gradient descent) step is run to train the model. The memory is then updated, for instance according to the example distance-based memory update method provided in FIG. 6.

In the example distance-based memory update method in FIG. 6, inputs include memory or memory bucket $\mathcal{M}$, $\mathcal{M}_c$, sample x, and the memory type, and the output is updated memory or memory bucket $\mathcal{M}$. The sample x is appended to the memory or memory bucket. If the memory or memory bucket is determined to be full, then an index i solving the global-distance optimization equation (e.g., Equation (3)) is determined if the memory type is max-global, and an index i that solves the cross-class optimization equation (e.g., Equation (4)) is determined if the memory type is min-cross-class. The $i_{th}$ element from the memory or memory bucket, which may include the new sample or an old sample, is then removed.

It is also contemplated that, once a sample existing in the memory is selected for being replaced by the new sample, a further determination can be made before replacement. This may be useful, for instance, if some of the new samples are not worth remembering at the expense of samples already stored. For example, once a sample $x_k$ is selected for removal, an example method may compare a change in the learning objective for substituting new sample x for $x_k$ with a change in objective for the opposite (sample $x_k$ for x). Based on this comparison, a final determination may be made as to whether the new sample is to replace the existing sample in memory or is not stored (e.g., rejected/discarded).

Figure 7:
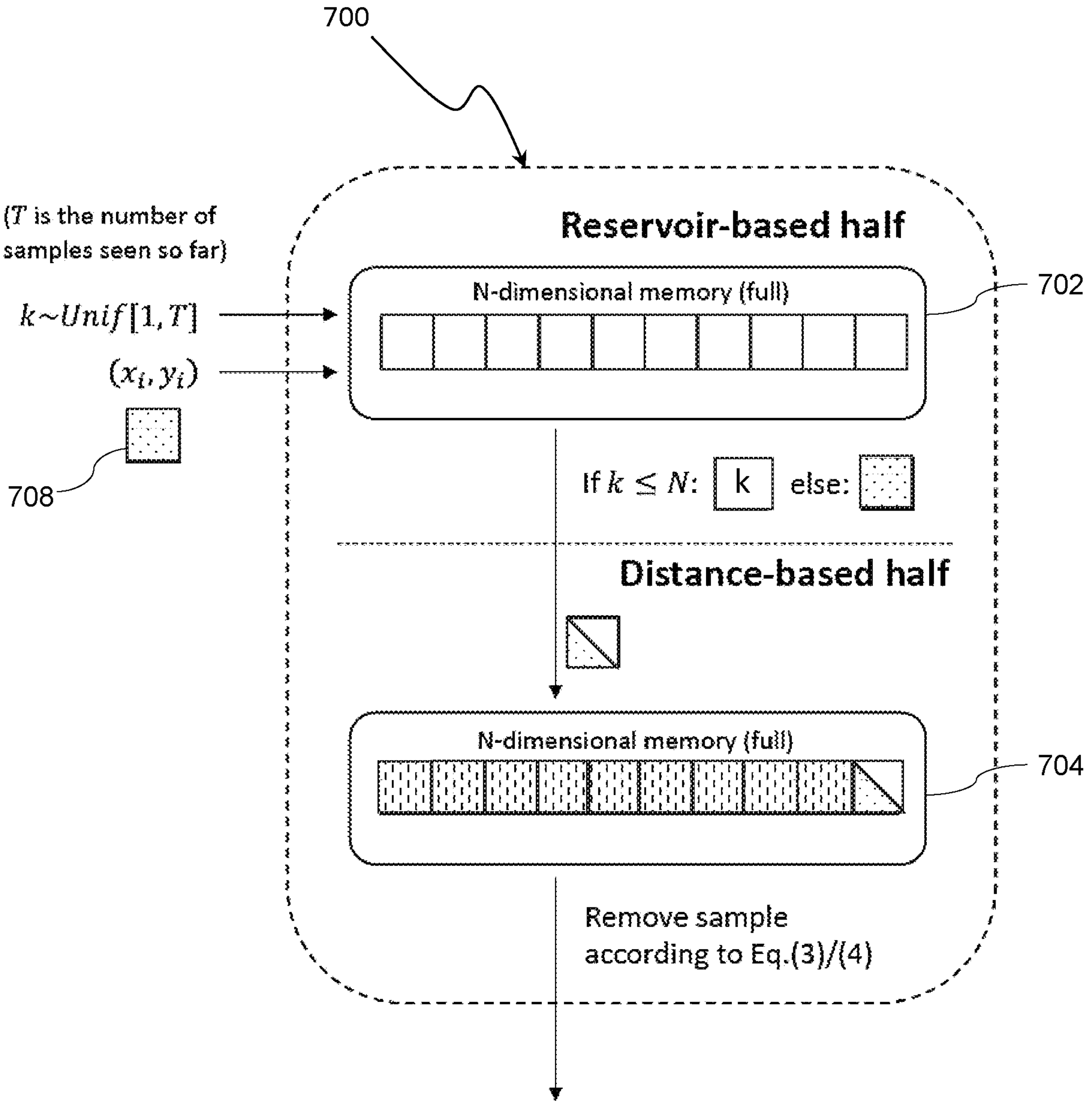
FIG. 7 shows an example hybrid memory system and method according to example embodiments.

Example distance-based memory update procedures disclosed herein can be combined with other memory update procedures such as random sampling, reservoir sampling, etc. Such memories can be referred to as hybrid memories, and example memory updating methods can be referred to as hybrid memory updating methods. In an example hybrid memory, such as shown in FIG. 7, a memory bank or buffer (memory) 700 is subdivided or partitioned into multiple (as shown two) memory regions 702, 704, each being controlled by different memory update methods. This allows the memory 700 to be updated based on multiple strategies or objectives.

For example, as shown in FIG. 7, a first memory region or portion 702 of the memory 700 is updated based on a reservoir sampling updating method such as disclosed herein with respect to FIG. 2B, and the remaining memory region 704 is distance-based according to the example distance-based method shown in FIG. 6. In an example embodiment, the memory regions 702, 704 are split equally (50%/50%) to provide a reservoir-based half and a distance-based half, but hybrid splits in other proportions are possible. In the distance-based memory portion 704 of the hybrid memory 700, a determination of which samples to remove can be guided by the max-global and/or min-cross-class methods based on the input or pre-selected memory type. Any combination of two, three, or more memory updating methods including global distance and/or cross-class memory updating methods are possible.

In an example hybrid memory updating method, when the memory 700 receives a new sample 708 from the time-varying data stream, it is given in input to the reservoir-based portion (e.g., half) 702 of the memory 700. At this stage, depending on a preliminary determination, three scenarios can arise: (a) if the memory 702 is not full, then the sample is simply added in memory; if the memory 702 is full, then it can happen that (b) a sample in memory is substituted with the new sample or (c) the new sample is not stored (e.g., rejected/discarded). In scenarios (b) or (c), the sample from the memory 702 or the new sample 708, respectively, are given in input to the distance-based half 704 of the memory 700, and a subsequent determination on whether to accept the new sample 708 can follow the max-global or min-cross-class methods disclosed above.

The example hybrid memory updating method illustrated in FIG. 7 combines an objective of storing samples in a more uniform manner over time (reservoir-based portion 702) and an objective of storing samples that do not occur that can be based, e.g., on the example distance-based memory update procedure 600 (distance-based portion 704). It is possible that the order can be reversed; e.g., the distance-based portion 704 may receive the new sample 708 and make a preliminary determination and may pass the new sample, if rejected by the distance-based portion 704, to the reservoir-based portion 702 for a subsequent determination. In other example methods, new samples may alternatively, or based on other criteria (e.g., detected change in distribution, by selection, by detected error, periodically, etc.), be initially input to either portion 702, 704. If more than two memory regions are provided, analogous series or parallel data processing methods may be used to update the memory 700.

Figure 8:
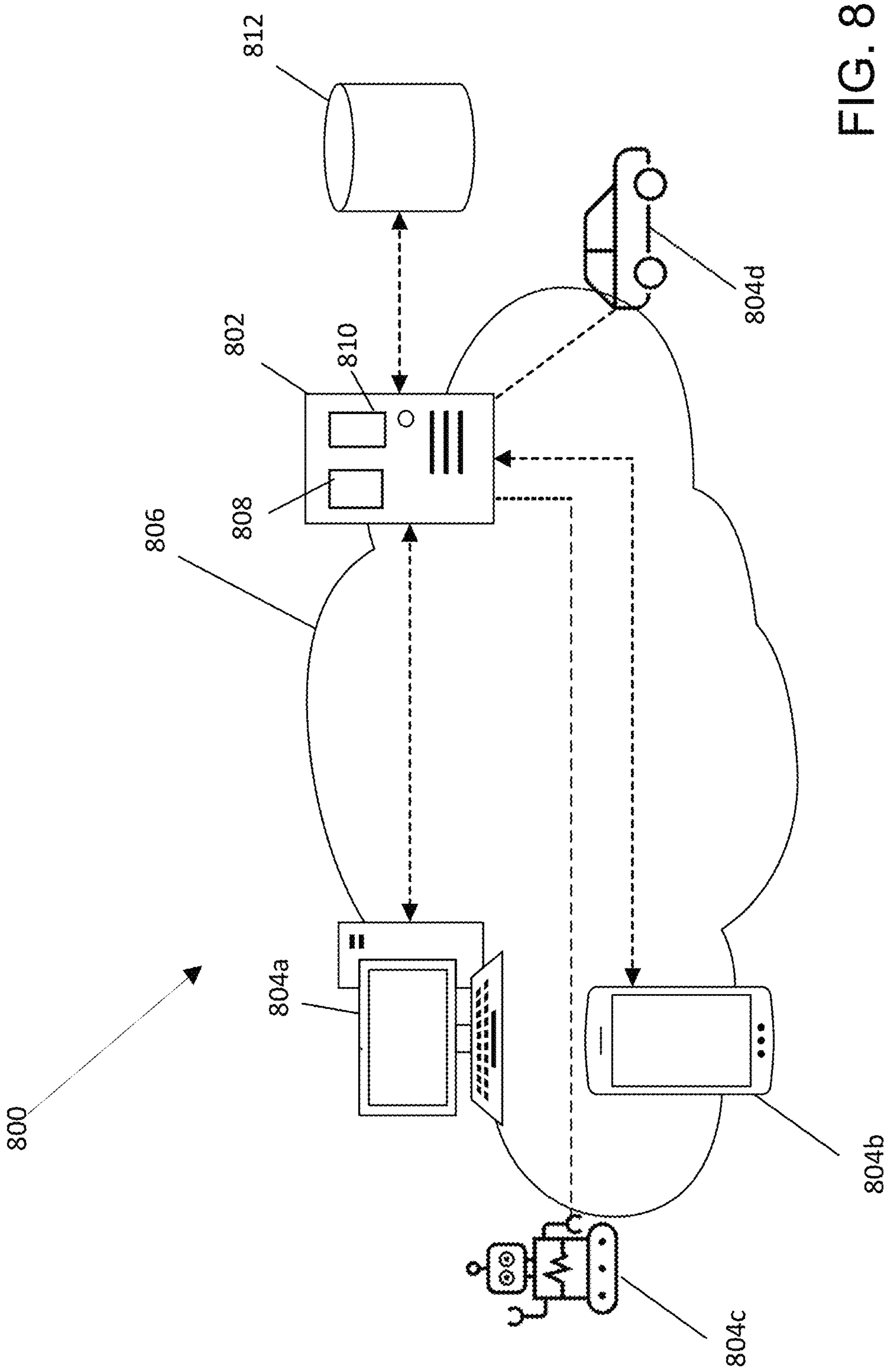
FIG. 8 shows an architecture including various devices that may be used to perform example methods.

Systems, methods, and embodiments disclosed herein may be implemented within an architecture 800 such as that illustrated in FIG. 8 or any portion thereof. The example architecture 800 includes a server 802 and one or more client devices 804*a*, 804*b*, 804*c*, 804*d* that communicate over a network 806 which may be wireless and/or wired, such as the Internet, for data exchange. The server 802 and the client devices 804*a-d* can each include a processor, e.g., processor 808 and a memory, e.g., memory 810 (shown by example in server 802), such as but not limited to random-access memory (RAM), read-only memory (ROM), hard disks, solid state disks, or other non-volatile storage media. Memory 810 may also be provided in whole or in part by external storage in communication with the processor 808.

The online learning system 102 in FIG. 1, for instance, may be implemented by a processor such as the processor 808 or other processor in the server 802 and/or client devices 804*a*-804*d*. It will be appreciated that the processor 808 can include either a single processor or multiple processors operating in series or in parallel. The memory 104 in FIG. 1 may be embodied, for instance, in memory 810 and/or suitable storage in the server 802, client devices 804*a-d,* a connected remote storage 812 (shown in connection with the server 802, but can likewise be connected to client devices), or any combination. Memory can include one or more memories, including combinations of memory types and/or locations. Memory can be stored in any suitable format for data retrieval and processing.

Server 800 may include, but are not limited to, dedicated servers, cloud-based servers, ora combination (e.g., shared). Data streams 100 may be communicated from, received by, and/or generated by the server 802 and/or the client devices 804*a-d*.

Client devices 804*a-d* may be any processor-based device, terminal, etc., and/or may be embodied in a client application executable by a processor-based device, etc. Client devices may be disposed within the server 802 and/or external to the server (local or remote, or any combination) and in communication with the server. Example client devices 804*a-d* include, but are not limited to, computers 804*a*, mobile communication devices (e.g., smartphones, tablet computers, etc.) 804*b*, robots or other agents 804*c*, autonomous vehicles 804*d*, wearable devices (not shown), virtual reality, augmented reality, or mixed reality devices (not shown), or other processor-based devices. Client devices 804*a-d* may be, but need not be, configured for sending data to and/or receiving data from the server 802, and may include, but need not include, one or more output devices, such as but not limited to displays, printers, etc. for displaying or printing results of certain methods that are provided for display by the server. Client devices may include combinations of client devices.

In an example training method, the server 802 or client devices 804*a-d* may receive new data streams from any suitable source, e.g., from memory 810 (as nonlimiting examples, internal storage, an internal database, etc.), from external (e.g., remote) storage 812 connected locally or over the network 806, etc. Data for new and/or existing data streams may be generated or received by the server 802 and/or client devices 804*a-d* using one or more input and/or output devices, sensors, communication ports, etc. For instance, in a self-supervised task of motion prediction, a device 804*a-d* such as a robot 804*c* or autonomous vehicle 804*d* may generate its own labels (e.g., depth prediction) or other synthetic data when it turns left or right.

Example continual training methods can generate an updated model and updated memory that can be likewise stored in the server (e.g., memory 810), client devices 804*a-d,* external storage 812, or combination. In some example embodiments provided herein, training and/or inference may be performed offline or online (e.g., at run time), in any combination. Results of training and/or inference can be output (e.g., displayed, transmitted, provided for display, printed, etc.) and/or stored for retrieving and providing on request.

Example trained neural network models can be operated (e.g., during inference or runtime) by processors and memory in the server 802 and/or client devices 804*a-d* to perform one or more tasks. Nonlimiting example tasks include classification tasks for various applications such as, but not limited to, computer vision, autonomous movement, and natural language processing. During inference or runtime, for example, a new data input (e.g., representing text, voice, image, sensory, or other data) can be provided to the trained model (e.g., in the field, in a controlled environment, in a laboratory, etc.), and the trained model can process the data input to provide, e.g., determine a classification of the data input. The classification can be used in additional, downstream decision making and/or displayed, transmitted, provided for display, printed, etc.) and/or stored for retrieving and providing on request.

Figure 9:
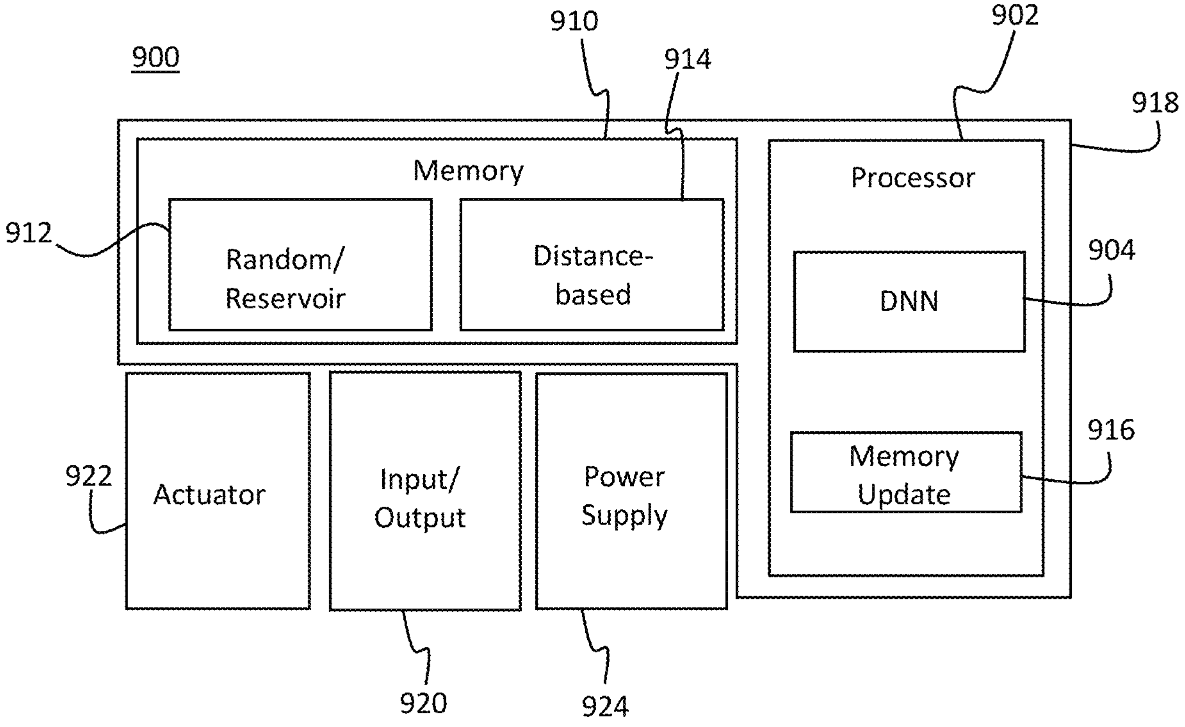
FIG. 9 shows components of an example processor-based device for performing example methods.

FIG. 9 shows components of an example processor-based device 900, such as embodied in the server 802 or client-based device 804*a-d*. The device 900 includes a processor 902 configured (e.g., executable) to provide a neural network for performing a task, e.g., deep neural network 904, which can provide, for instance, the feature extractor 110 and the logit layer 112 of the neural network model 108. A hybrid memory 910, e.g., any suitable writable and/or readable memory, includes a first memory region 912 for random sampling based storage and a second memory region 914 for distance-based storage. If the memory 910 is not a hybrid memory, the first (random sampling) memory region 912 may be omitted.

The processor 902 further includes a memory updating module 916 that is configured (e.g., using executable instructions) to perform example data processing methods including memory updating as provided herein. The neural network 904, memory 910, and memory updating module 916 provide an example online learning system 918 for receiving data streams and training the model provided by the neural network.

The processor-based device 900 can further include one or more input or output components 920, which can be used to receive and/or generate data streams during online continual learning, or to receive and/or generate new inputs during inference (runtime). The input or output components can be selected and configured for the particular data to be generated or received. As a nonlimiting example, for a computer vision application, an input component may include a light sensor (e.g., a charge-coupled device (CCD)) or other visual detector, an orientation sensor, a motion sensor, or other sensors to provide vision-related data. For language processing, a text input device (keyboard, mouse, touch screen, etc.) and/or audio processor and microphone may be used. During inference, new data from the input or output components 920 can be processed using the trained neural network 904 implemented by the processor 902 to perform classification tasks. The device 900 may also include outputs 920 and/or one or more actuators 922 for outputting results or performing actions based on the tasks performed by the neural network 904. A suitable power supply 924 can also be provided.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium. In an embodiment, a storage medium (or a data carrier, or a computer-readable medium) comprises, stored thereon, the computer program or the computer-executable instructions for performing one of the methods described herein when it is performed by a processor.

Embodiments described herein may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM ora FLASH memory. Such computer-readable media can be any available media that can be accessed by a general-purpose or special-purpose computer system.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium.

Experiments

Experiments using example online continual learning methods will now be described with respect to two different supervised learning tasks, where data is observed in a streaming fashion. One example learning task focuses on digit recognition, where samples are received from sequentially different datasets in a streaming fashion. Another learning task considers the PACS dataset, as disclosed in Li et al., “Deeper, broader and artier domain generalization,” In Proceedings of the International Conference on Computer Vision (ICCV), 2017 (incorporated herein by reference), where streaming data is received from sequentially different visual domains.

For the example digits learning task, seven different digit datasets were considered: MNIST (Lecun et al., “Gradient-based learning applied to document recognition,” In Proceedings of the IEEE, pages 2278-2324, 1998), SVHN (Netzer et al., “Reading digits in natural images with unsupervised feature learning,” In NIPS Workshop on Deep Learning and Unsupervised Feature Learning, 2011), MNIST-M (Ganin et al., “Unsupervised domain adaptation by backpropagation,” In Proceedings of the 36th International Conference on Machine Learning (ICML), 2015), SYN (Ganin et al.), USPS (Hull, “A database for handwritten text recognition research,” IEEE Transactions on Pattern Analysis and Machine Intelligence, 1994), and two variations of MNIST where the samples from specific classes are biased toward specific colors, making out-of-domain generalization more difficult.

10,000 samples per dataset were considered to overcome the size differences. Learning trajectories were defined, where learning occurred in a streaming fashion (one sample at a time) from the sequence of datasets $$(\mathcal{D}_i)_{i=1}^{7}.$$

Ten random permutations of the seven datasets were considered, and at the end performance on each of them was assessed. While training, information was not available on the domain-change; that is, it was not known when one stopped receiving samples from domain $\mathcal{D}_i$ and began receiving samples from domain $D_j$.

Since one goal of the experiments was to understand in which conditions simple strategies such as reservoir sampling fail, experimental methods considered different variations on the protocol, namely domain-balanced sequences (shown as Balanced Domains in Tables 1-3 below), and domain-imbalanced sequences. In both cases, results were considered and averaged over the same random permutations across all datasets at the end of the sequence. For the domain-imbalanced experiments, two example cases were considered: one where the proportion was 1:10 (the dominant dataset had 10,000 samples and the others 1,000); and one where the proportion was 1:2 (the dominant dataset had 10,000 samples and the others 5,000). These are indicated in Tables 1-3 with Dom. (++) and Dom. (+) respectively.

In all digits experiments, a 500-dimensional memory was considered. For the choice of the dominant domain, the experiments considered SVHN (a difficult, heterogeneous domain) and the most biased of the MNIST versions from Kim et al., (Learning not to learn: Training deep neural networks with biased data,” In Proceedings of the IEEE Conference on Computer Vision and Pattern Recognition (CVPR), 2019 (a simple, homogeneous domain).

For the PACS experiments, the PACS dataset (Li et al.), typically used in domain generalization problems, was considered. The PACS dataset included images associated with seven classes (dog, elephant, giraffe, guitar, horse, house, person). The total number of images was 9,991, drawn from four different domains (sketches, cartoons, paintings, photos). 1,100 samples per dataset were used. Training sequences were defined in which one learns one sample at the time from sequential domains $$(\mathcal{D}_i)_{i=1}^{4},$$

carrying out the same analysis performed for the digits experiments. In all PACS experiments, a 250-dimensional memory was considered.

Results for the digits experiments are shown in Table 1 below, and results for PACS are shown in Tables 2 and 3.

Digits with balanced, moderate (+) and highly (++) unbalanced domains

| | Training protocol | | | | |
|---|---|---|---|---|---|
| Memory | Balanced Domains | Dom.(++) SVHN | Dom.(+) SVHN | Dom.(++) BiasMNIST | Dom.(+) BiasMNIST |
| Random (w/o buckets) | 75.6 (5.6) | 81.0 (2.3) | 76.5 (6.5) | 75.0 (11.1) | 85.1 (1.3) |
| Random (w/buckets) | 77.7 (5.4) | 82.1 (2.0) | 77.2 (6.5) | 76.4 (8.4) | 85.0 (1.2) |
| Reservoir (w/o buckets) | 85.1 (1.3) | 83.1 (1.2) | 85.9 (1.2) | 77.6 (2.7) | 75.7 (7.1) |
| Reservoir (w/buckets) | 84.5 (1.6) | 83.6 (1.7) | 85.8 (1.1) | 77.8 (2.3) | 76.2 (7.1) |
| Max-dist. (Eq. 3) (w/buckets) | 81.2 (2.6) | 81.9 (2.0) | 81.9 (3.3) | 77.9 (5.8) | 81.7 (2.8) |
| Min-dist. (Eq. 4) (w/buckets) | 82.4 (2.2) | 79.6 (1.6) | 82.7 (2.5) | 80.2 (3.2) | 83.8 (2.3) |
| Hybrid: Reservoir + Max-dist. (Eq. 3) (w/buckets) | 84.9 (2.0) | 84.0 (0.8) | 86.0 (1.3) | 78.5 (4.1) | 84.7 (1.6) |
| Hybrid: Reservoir + Min.-dist. (Eq. 4) (w/buckets) | 85.5 (1.3) | 83.4 (1.0) | 86.2 (1.0) | 79.8 (3.1) | 85.5 (0.8) |

Table 1 shows results on digits experiments for the conventional random and reservoir baselines (top), example distance-based methods (middle), and example hybrid models including distance-based methods and reservoir-based methods (bottom). As shown in Table 1, the performance of baseline methods depended highly on whether and how different domains are balanced during learning. Hybrid models according to example embodiments, on the other hand, produced consistent results that were either better than or comparable to the alternatives.

PACS with balanced and highly unbalanced (++) domains

| | Training protocol | | | | |
|---|---|---|---|---|---|
| Memory | Balanced Domains | Dom.(++) Sketches | Dom.(++) Cartoons | Dom.(++) Paintings | Dom.(++) Photos |
| Random (w/buckets) | 62.7 (4.2) | 62.8 (4.9) | 68.6 (2.7) | 71.2 (3.5) | 64.2 (6.1) |
| Reservoir (w/buckets) | 75.1 (2.7) | 65.9 (6.3) | 69.6 (3.6) | 73.3 (2.2) | 66.5 (4.5) |
| Hybrid: Reservoir + | 74.4 (2.6) | 72.0 (2.4) | 72.7 (2.7) | 72.9 (3.9) | 70.0 (2.8) |

-continued

PACS with balanced and highly unbalanced (++) domains

| Memory | Training protocol Balanced Domains | Dom.(++) Sketches | Dom.(++) Cartoons | Dom.(++) Paintings | Dom.(++) Photos |
|---|---|---|---|---|---|
| Max-dist. (Eq. 3) (w/buckets) Hybrid: Reservoir + Min-dist. (Eq. 4) (w/buckets) | 71.7 (2.6) | 67.4 (3.1) | 70.5 (3.9) | 73.2 (3.0) | 69.9 (3.6) |

Table 2 shows results for PACS experiments for random and reservoir baselines (top) and example hybrid distance-based methods (bottom), with balanced and highly unbalanced (++) domains. Again, the performance of the baseline methods depended on the balance between different domains in the dataset. The hybrid methods according to example embodiments, on the other hand, produced consistent results that were either better or comparable to the other methods above.

PACS with moderately unbalanced domains (+)

| Memory | Training protocol Dom.(+) Sketches | Dom.(+) Cartoons | Dom.(+) Paintings | Dom.(+) Photos |
|---|---|---|---|---|
| Random (w/buckets) | 66.7 (2.6) | 66.2 (4.3) | 67.3 (3.3) | 65.8 (6.9) |
| Reservoir (w/buckets) | 74.4 (3.6) | 75.8 (2.5) | 75.2 (3.3) | 74.5 (3.0) |
| Hybrid: Reservoir + Max-dist. (Eq. 3) (w/buckets) | 76.2 (2.7) | 75.0 (1.7) | 75.7 (2.4) | 75.2 (2.5) |
| Hybrid: Reservoir + Min-dist. (Eq. 4) (w/buckets) | 73.0 (3.0) | 74.3 (2.7) | 75.9 (2.4) | 75.2 (1.5) |

Table 3 shows additional results from PACS experiments with moderately unbalanced domains (+). Again, the example hybrid max-distance methods provided the most consistent results across multiple unbalances and performed either comparable or better than the alternatives.

The experiments demonstrated how random sampling performed consistently and considerably worse than either reservoir sampling memory update methods or memory update methods (distance-based and hybrid) according to example embodiments. While random sampling may provide improved results in some circumstances, such methods do not consistently account for significant distributional shifts, as illustrated by the experiments.

Additionally, while in some experiments, reservoir sampling methods provided a strong baseline, once the experiments considered shifting domains and unbalanced cases, such as where one distribution dominated over others (cf. "Dom." columns in Tables 1-3), reservoir sampling often led to sub-optimal performance. For example, there was a significant drop in performance when BiasMNIST was the dominant domain in the Digits protocol (Table 1), as well as when Sketches/Cartoons were the dominant domains in the PACS protocol (Table 2).

While the experiments were designed to specifically control for domain unbalances, such situations would be naturally expected to arise in practical use. As a nonlimiting example, consider a house robot (an example processor-based device) that is enabled with a memory-based online continual learning algorithm. In this case, the dominant domain might be a particular environment with specific light conditions, whose samples would not allow for good generalization if they dominated the memory.

On the other hand, the experimental results show that a memory that reasons by accounting for the space of the learned visual representation is significantly less vulnerable against such distributional shifts, as illustrated by the consistent results for example methods in Tables 1-3. This is further illustrated by a comparison of the performance of present methods with respect to reservoir sampling in such situations.

Using example hybrid memory update methods can provide improved performance in more balanced cases. Among the two example types of hybrid memories evaluated in the above experiments, the one in which the distance-based half relies on the "global-max" distance (e.g., based on Equation (3)) generally performed better than the alternative that relied on the "cross-class distance" (e.g., based on Equation (4)). For instance, in the results related with the former memory in Table 2, while reservoir-based sampling performance oscillated between 75% and 65% according to differences in the domain sequence, performance with present example methods were always above 72% on average.

Further, there was a large standard deviation of the reservoir sampling results when the dominant domain was Sketches (>6%). This reflects the low reliability of using memories that are driven by decision rules based on randomness.

General

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

All references disclosed herein are hereby incorporated by reference in their entirety.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. A method for processing a stream of samples in an online learning system for updating a machine learning model configured for performing a classification task, the method being implemented by a processor in communication with a memory, the method comprising:

accessing from samples previously stored in the memory a set of samples for training the machine learning model for performing the classification task, wherein the memory is partitioned into at least a first memory region and a second memory region;

receiving a sample from the stream of samples;

combining the received sample with the set of samples accessed from the memory to provide a set of combined samples;

training the machine learning model using the set of combined samples on the classification task, wherein said training comprises:

embedding each sample of the set of combined samples into an embedding space of embedded samples using an encoder of the machine learning model;

generating a classification from the embedded samples using the machine learning model; and optimizing the machine learning model using the generated classification;

upon determining that the sample received from the stream of samples meets a first criterion, storing in the first memory region the sample received from the stream of samples; and upon determining the sample received from the stream of samples does not meet the first criterion and meets a second criterion, storing in the second region the sample received from the stream of samples; and upon determining the sample received from the stream of samples does not meet the first criterion and does not meet the second criterion, discarding the sample received from the stream of samples from the first memory region and the second memory region;

wherein one of the first or the second criterion comprises one of:

determining whether the sample received from the stream of samples when embedded is within a subset of samples from the embedded samples that maximizes a sum of distances across pairs of samples; or determining whether the sample received from the stream of samples when embedded is within a subset of the samples from the embedded samples that minimizes a sum of distances across pairs of samples from different classes;

wherein at least one of the set of samples accessed from the memory was previously determined to meet either the first criterion and stored in the first memory region or previously determined to meet the second criterion and stored in the second memory region; and wherein the classification task comprises a computer vision task, autonomous movement task, search engine optimization task, and/or natural language processing task that includes a classification.

2. The method of claim 1, wherein said storing in the first memory region the sample received from the stream of samples comprises:

identifying a sample from the samples stored in the first memory region; and replacing the identified sample stored in the first memory region with the sample received from the stream of samples.

3. The method of claim 2, wherein the sample received from the stream of samples replaces the identified sample upon determining that the identified sample no longer meets the first criterion.

4. The method of claim 1, wherein said storing in the second memory region the sample received from the stream of samples comprises:

identifying a sample from the samples stored in the second memory region; and replacing the identified sample stored in the second memory region with the sample received from the stream of samples.

5. The method of claim 4, wherein the sample received from the stream of samples replaces the identified sample upon determining that the identified sample no longer meets the second criterion.

6. The method of claim 1, wherein either the first criterion or the second criterion comprises determining whether the sample received from the stream of samples when embedded is within a subset of samples from the embedded samples that maximizes a sum of distances across pairs of samples;

wherein said determining whether the sample received from the stream of samples when embedded is within a subset of samples from the embedded samples that maximizes a sum of distances across pairs of samples maximizes heterogeneity between the combined samples in the embedding space by selecting samples to be stored in the memory such that the points are maximally spread in the embedding space.

7. The method of claim 1, wherein either the first criterion or the second criterion comprises determining whether the sample received from the stream of samples when embedded is within a subset of the samples from the embedded samples that minimizes a sum of distances across pairs of samples from different classes;

wherein said determining whether the sample received from the stream of samples when embedded is within a subset of the samples from the embedded samples that minimizes a sum of distances across pairs of samples from different classes selects samples that are closer to class boundaries of the classification task than other samples from the embedded samples.

8. The method of claim 1, wherein the stream of samples comprises one or more of images or features.

9. The method of claim 1, wherein the machine learning model comprises a deep neural network model.

10. The method of claim 1, wherein said training comprises learning according to a self-supervised learning objective.

11. The method of claim 10, wherein said training further comprises learning according to a supervised objective in a multi-task setting; and wherein the memory is shared by the self-supervised learning objective and the supervised objective.

12. The method of claim 11, wherein said learning according to the self-supervised learning objective uses a first encoder for encoding features of the set of combined samples; and wherein said learning according to the supervised objective uses a second encoder for encoding features of the set of combined samples.

13. The method of claim 1, wherein the stream of samples is a stream of continuous samples.

14. The method of claim 13, wherein each sample in the stream of samples comprises a class.

15. A method for classifying a data input, the method comprising:

receiving the data input by a machine learning model trained according to claim 1;

processing, using the machine learning model, the received data input to determine a classification; and outputting the classification.

16. The method of claim 1, wherein the first criterion comprises determining whether the sample received from the stream of samples when embedded is within a subset of samples from the embedded samples that maximizes a sum of distances across pairs of samples or determining whether the sample received from the stream of samples when embedded is within a subset of the samples from the embedded samples that minimizes a sum of distances across pairs of samples from different classes.

17. The method of claim 1, wherein the second criterion is based on one of a random sampling method and a reservoir sampling method.

18. The method of claim 1, wherein the second criterion comprises determining whether the sample received from the stream of samples when embedded is within a subset of samples from the embedded samples that maximizes a sum of distances across pairs of samples or determining whether the sample received from the stream of samples when embedded is within a subset of the samples from the embedded samples that minimizes a sum of distances across pairs of samples from different classes; and wherein the first criterion is based on one of a random sampling method and a reservoir sampling method.

19. The method of claim 1, further comprising:

repeating the method for each of a plurality of time steps;

wherein, for each of the plurality of time steps, said receiving a sample from the stream of samples receives a single sample such that the method is performed one sample at a time.

20. An online learning system comprising:

a memory configured to store a plurality of samples, wherein the memory is partitioned into at least a first memory region and a second memory region; and a machine learning model for performing a classification task comprising a computer vision task, autonomous movement classification task, search engine optimization task, and/or natural language processing task that includes a classification, the machine learning model being implemented by a processor in communication with the memory, the machine learning model comprising an encoder trained to embed the plurality of samples in the memory in an embedding space of embedded samples;

wherein the processor is configured to:

receive a new sample;

combine the received sample with a set of samples accessed from the memory to provide a set of combined samples;

train the machine learning model on the classification task using the set of combined samples, wherein said training comprises:

embedding each sample of the set of combined samples into an embedding space of embedded samples using an encoder of the machine learning model;

generating a classification from the embedded samples using the machine learning model; and optimizing the machine learning model using the generated classification;

upon determining that the sample received from the stream of samples meets a first criterion, store in the first memory region the sample received from the stream of samples; and upon determining the sample received from the stream of samples does not meet the first criterion and meets a second criterion, store in the second region the sample received from the stream of samples; and upon determining the sample received from the stream of samples does not meet the first criterion and does not meet the second criterion, discard the sample received from the stream of samples from the first memory region and the second memory region;

wherein either the first or the second criterion comprises one of:

determining whether the sample received from the stream of samples when embedded is within a subset of samples from the embedded samples that maximizes a sum of distances across pairs of samples; or determining whether the sample received from the stream of samples when embedded is within a subset of the samples from the embedded samples that minimizes a sum of distances across pairs of samples from different classes;

wherein at least one of the set of samples accessed from the memory was previously determined to meet either the first criterion and stored in the first memory region or previously determined to meet the second criterion and stored in the second memory region.

21. The system of claim 20, wherein the machine learning model comprises a deep neural network model.

22. The system of claim 20, wherein said storing the sample received from the stream of samples in the first memory region comprises replacing an existing sample in the first memory region with the sample received from the stream of samples.;

wherein the sample received from the stream of samples replaces the existing sample in the first memory region based on said first criterion;

wherein said storing the sample received from the stream of samples in the second memory region comprises replacing an existing sample in the second memory region with the sample received from the stream of samples, wherein the sample received from the stream of samples replaces the existing sample in the second memory region based on said second criterion.

23. The system of claim 22, further comprising:

determining to store the sample received from the stream of samples in the first memory region or the second memory region if the sample received from the stream of samples is in a selected set;

wherein the existing sample that is replaced is not in the selected set.

24. The system of claim 23, wherein the selected set maximizes heterogeneity between the combined samples in the embedding space.

25. The system of claim 20, wherein the trained machine learning model classifies a new data input by:

receiving the new data input;

processing, using the trained machine learning model, the received data input to determine a classification; and outputting the classification.

26. The online learning system of claim 20, wherein said first criterion comprises selecting a subset of the samples from the embedded samples that minimizes a sum of distances across pairs of samples from different classes.

27. The online learning system of claim 20, wherein said second criterion comprises selecting a set of samples from the embedded samples that minimizes a sum of distances across pairs of samples from different classes.

28. A method for processing a stream of samples for updating a machine learning model configured for performing a classification task, the method being implemented by a processor in communication with a memory, the method for processing samples received in the stream of samples for updating the machine learning model comprising:

(a) partitioning the memory into a first memory region and a second memory region;

(b) accessing from the memory a set of samples for training the machine learning model for performing the classification task;

(c) defining a set of combined samples that includes a sample received from the stream of samples and the set of samples accessed from the memory;

(d) training the machine learning model using the set of combined samples; said training the machine learning model defining an embedding space with the set of combined samples;

(e) determining whether to store the sample received from the stream of samples in the first memory region based on distances between samples in the set of combined samples in the embedding space that (i) maximizes a global distance across samples, or (ii) minimizes a sum of distances across samples from different classes;

(f) storing in the first memory region the sample received from the stream of samples when said determining at (e) determines to store the sample received from the stream of samples in the first memory region; and (g) when the sample received from the stream of samples is not stored in the first memory region, determining whether to store the sample in the second memory region based on a random sampling or a reservoir sampling;

(h) storing in the second memory region the sample received from the stream of samples when said determining at (g) determines to store the sample in the second memory region.

29. A method for processing a stream of samples for updating a machine learning model configured for performing a classification task, the method being implemented by a processor in communication with a memory, the method for samples received in the stream of samples for updating the machine learning model comprising:

(a) partitioning the memory into a first memory region and a second memory region;

(b) accessing from the memory a set of samples for training the machine learning model for performing the classification task;

(c) defining a set of combined samples that includes a sample received from the stream of samples and the set of samples accessed from the memory;

(d) training the machine learning model using the set of combined samples; said training the machine learning model defining an embedding space with the set of combined samples;

(e) determining whether to store the sample received from the stream of samples in the first memory region based on a random sampling or a reservoir sampling;

(f) storing in the first memory region the sample received from the stream of samples when said determining at (e) determines to store the sample received from the stream of samples in the first memory region; and (g) when the sample received from the stream of samples is not stored in the first memory region, determining whether to store the sample in the second memory based on distances between samples in the set of combined samples in the embedding space that (i) maximizes a global distance across samples, or (ii) minimizes a sum of distances across samples from different classes;

(h) storing in the second memory region the sample received from the stream of samples when said determining at (g) determines to store the sample in the second memory region.

* * * * *